(12) United States Patent
Bala (10) Patent No.: US 10,014,791 B2
(45) Date of Patent: Jul. 3, 2018

(54) DISTRIBUTION TRANSFORMER

(71) Applicant: ABB TECHNOLOGY AG, Zurich (CH)

(72) Inventor: Sandeep Bala, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 141 days.

(21) Appl. No.: 14/423,523

(22) PCT Filed: Aug. 23, 2013

(86) PCT No.: PCT/US2013/056393
§ 371 (c)(1),
(2) Date: Feb. 24, 2015

(87) PCT Pub. No.: WO2014/031959
PCT Pub. Date: Feb. 27, 2014

(65) Prior Publication Data
US 2015/0263636 A1    Sep. 17, 2015

Related U.S. Application Data

(60) Provisional application No. 61/692,759, filed on Aug. 24, 2012.

(51) Int. Cl.
*H01F 27/28*   (2006.01)
*H01F 27/24*   (2006.01)
(Continued)

(52) U.S. Cl.
CPC ............ *H02M 5/458* (2013.01); *H01F 27/24* (2013.01); *H01F 27/2823* (2013.01);
(Continued)

(58) Field of Classification Search
CPC .... H02M 5/458; H02M 5/4585; H02M 1/126; H02M 7/487; H01F 38/14; H01F 27/24;
(Continued)

(56) References Cited

U.S. PATENT DOCUMENTS 1,812,202 A    6/1931  Dowling et al.
2,891,210 A *  6/1959  Mulder ................... H01F 29/14
                                               219/130.33
(Continued)

FOREIGN PATENT DOCUMENTS

CH        620313 A5    11/1980
CN       1043049 A      6/1990
(Continued)

OTHER PUBLICATIONS

EP Communication cited in EP Application No. 13759371.1 dated May 24, 2016, 36 pgs.
(Continued)

*Primary Examiner* — Mangtin Lian
(74) *Attorney, Agent, or Firm* — J. Bruce Schelkopf; Taft Stettinius & Hollister LLP (57) ABSTRACT

Among other things, a distribution transformer and a technique for regulating voltage are provided for herein. The distribution transformer comprises at least three windings and at least two ferromagnetic cores. The distribution transformer may also comprise a power electronic AC-AC converter operable to maintain the input voltage and current of the distribution transformer substantially in phase and/or to reduce fluctuation in the output voltage of the distribution transformer in the event of an increase or decrease in the input voltage, for example.

20 Claims, 7 Drawing Sheets

(51) Int. Cl.
| | |
|---|---|
| *H01F 17/04* | (2006.01) |
| *H01F 17/00* | (2006.01) |
| *H02M 7/04* | (2006.01) |
| *H02M 5/458* | (2006.01) |
| *H01F 27/38* | (2006.01) |
| *H01F 27/40* | (2006.01) |
| *H01F 27/42* | (2006.01) |
| *H01F 38/14* | (2006.01) |
| *H01F 29/14* | (2006.01) |
| *H02M 7/487* | (2007.01) |
| *H02M 1/12* | (2006.01) |

(52) U.S. Cl.
CPC ............ *H01F 27/38* (2013.01); *H01F 27/40* (2013.01); *H01F 27/42* (2013.01); *H01F 38/14* (2013.01); *H02M 5/4585* (2013.01); *H01F 2029/143* (2013.01); *H02M 1/126* (2013.01); *H02M 7/487* (2013.01)

(58) Field of Classification Search
CPC ...... H01F 27/2823; H01F 27/40; H01F 27/42; H01F 27/38; H01F 2029/143
USPC ........... 336/170, 221, 212, 5, 146, 184, 214; 323/355; 363/35, 75, 93
See application file for complete search history.

(56) References Cited

U.S. PATENT DOCUMENTS

| | | | | |
|---|---|---|---|---|
| 3,188,552 | A | * 6/1965 | Owen | .............. H01F 29/14 323/334 |
| 3,219,881 | A | * 11/1965 | Rudaz | ................. B23K 9/0732 219/130.1 |
| 3,221,280 | A | 11/1965 | Malsbary et al. | |
| 4,041,431 | A | * 8/1977 | Enoksen | ................ H01F 29/14 174/DIG. 17 |
| 4,447,866 | A | * 5/1984 | Reeves | ............ H02M 3/33561 323/266 |
| 5,177,460 | A | 1/1993 | Dhyanchand et al. | |
| 5,355,296 | A | 10/1994 | Kuo et al. | |
| 5,737,203 | A | * 4/1998 | Barrett | .............. H02M 3/33561 323/355 |
| 2002/0131284 | A1 | * 9/2002 | Jiang | ................. H02M 3/33561 363/98 |
| 2010/0201338 | A1 | * 8/2010 | Haj-Maharsi | ....... H02M 1/4233 323/305 |
| 2010/0220499 | A1 | 9/2010 | Haj-Maharsi et al. | |
| 2010/0315190 | A1 | 12/2010 | Haj-Maharsi et al. | |

FOREIGN PATENT DOCUMENTS

| | | | |
|---|---|---|---|
| CN | 2199636 | Y | 5/1995 |
| CN | 101414195 | A | 4/2009 |
| CN | 101657048 | A | 2/2010 |
| DE | 310908 | C | 2/1919 |
| DE | 3312124 | A1 | 10/1984 |
| FR | 1121129 | A | 7/1956 |
| FR | 1129403 | A | 1/1957 |
| GB | 760724 | A | 11/1956 |
| GB | 2480707 | A | 11/2011 |
| WO | 2005076293 | A1 | 8/2005 |
| WO | 2011134521 | A1 | 11/2011 |

OTHER PUBLICATIONS

International Search Report cited in related application No. PCT/US13/056393 dated Mar. 7, 2014, pp. 21.

Qin, et al., "A Comparative Efficiency Study of Silicon-based Solid State Transformers", 2010, Published in Energy Conversion Congress and Exposition (ECCE), 2010 IEEE, pp. 1-6, http://ieeexplore.ieee.org/xpl/login.jsp?tp=&arnumber=5618255&url=http%3A%2F%2Fieeexplore.ieee.org%2Fxpls%2Fabs_all.jsp%3Farnumber%3D5618255.

Carrasco, et al., "Power-Electronic Systems for the Grid Integration of Renewable Energy Sources: A Survey", Published in: Industrial Electronics, IEEE Transactions on (vol. 53 , Issue: 4 ), pp. 1002-1016, Aug. 2006, http://ieeexplore.ieee.org/xpl/login.jsp?tp=&arnumber=1667898&url=http%3A%2F%2Fieeexplore.ieee.org%2Fxpls%2Fabs_all.isp%3Farnumber%3D1667898.

Lin, Bor-Ren, "High Power Factor AC/DC/AC Converter with Random PWM", pp. 935-943, Jul. 1999, Published in: Aerospace and Electronic Systems, IEEE Transactions on (vol. 35 , Issue: 3 ), http://ieeexplore.ieee.org/xpl/login.jsp?tp=&arnumber=784063&url=http%3A%2F%2Fieeexplore.ieee.org%2Fiel5%2F7%2F17004%2F00784063.pdf%3Farnumber%3D784063.

Gyugyi, L., "A unified flow control concept for flexible AC transmission systems", IEE proceedings. Part C. Generation, transmission and distribution, 1992, pp. 323-331.

Fujita, et al., "The unified power quality conditioner : The integration of series- and shunt-active filters", IEEE transactions on power electronics, 1998, pp. 315-322, http://www.google.com/url?sa=t&rct=j&q=&esrc=s&source=web&cd=3&ved=0CC8QFjAC&url=http%3A%2F%2Fousar.lib.okayama-u.ac.jp%2Ffile%2F34096%2Ffulltext.pdf&ei=3sPsVKT0GIGGNuqlgLAC&usg=AFQjCNF39tys-NBMFkkobNWoZjTjZAKmMw.

First Chinese Office Action cited in Chinese Application No. 213-82255545 dated Feb. 22, 2016, 6 pgs.

EP Communication cited in EP Application No. 13 759 371.1 dated May 17, 2017, 4 pgs.

* cited by examiner

DISTRIBUTION TRANSFORMER

REFERENCE TO RELATED APPLICATION

This application claims priority to U.S. Provisional Application No. 61/692,759 entitled "DISTRIBUTION TRANSFORMER", filed Aug. 24, 2012, at least some of which may be incorporated herein.

BACKGROUND

The present application relates to the field of power distribution and more particularly to a hybrid distribution transformer configured to regulate a voltage of a load.

Modern society's movement into the digital age is necessitating the development of a more reliable supply of high-quality electricity. An indispensable component in the supply of electricity to end-users is a distribution transformer. A conventional distribution transformer converts electricity at one voltage to electricity at another voltage, which may be of a higher or lower value. A transformer achieves this voltage conversion using a primary winding and a secondary winding, each of which is wound around a ferromagnetic core and comprises a numbers of turns of an electrical conductor (e.g., a metal wire or other conductor). A conventional distribution transformer employed in the present day power distribution systems cannot protect digital loads against poor power quality, such as sags, swells, and/or distortion. It is estimated that voltage disturbances cost millions of dollars every year to industries around the world.

Sometimes systems are connected to a power distribution line to improve power quality. Examples of such systems include dynamic voltage restores (DVRs) and static VAR compensators (SVCs). DVRs sustain and/or restore an operational electric load during sags and/or spikes in voltage supply, while SVCs provide fast-acting power compensation on power networks. DVRs and SVCs are often "add on" systems that are connected to, and used with, conventional distribution transformers.

SUMMARY

Aspects of the present application address the above and/or other matters. According to one aspect, a distribution transformer having a primary side for receiving an input voltage and an input current from a source and a secondary side for providing an output voltage and an output current to a load is provided. The distribution transformer comprises at least a first ferromagnetic core and a second ferromagnetic core. Wound around the first ferromagnetic core is a first winding and a second winding. Wound around the second ferromagnetic core is a control winding and the second winding. At least one of the first or the second windings are configured for connection to the source and at least one of the first or the second windings are configured for connection to the load.

According to another aspect, a power distribution system comprised of two or more transformers linked together is provided. Respective transformers of the distribution transformer have a primary side for receiving an input voltage and an input current from a source and a secondary side for providing an output voltage and an output current to a load. Respective transformers also comprise at least a first ferromagnetic core and a second ferromagnetic core. Wound around the first ferromagnetic core is a first winding and a second winding. Wound around the second ferromagnetic core is a control winding and the second winding. At least one of the first or the second windings are configured for connection to the source and at least one of the first or the second windings are configured for connection to the load. Respective transformers also comprise an AC-AC converter.

According to another aspect, a method for at least one of regulating an output voltage of a distribution transformer or controlling a power factor on a primary side of the distribution transformer to which the input voltage is received is provided. The method comprises receiving, at an AC-AC converter, a first electrical signal output by at least one of a source configured to provide the input voltage, a second winding electrically coupled to a load, or an auxiliary winding inductively coupled to a first winding that is electrically coupled to the source. The method also comprises generating, at the AC-AC converter, a control voltage based upon the first electrical signal. The method further comprises applying the control voltage to a second electrical signal via a control winding electrically coupled to the AC-AC converter to at least one of regulate the output voltage of the distribution transformer or control the power factor on the primary side of the distribution transformer.

FIGURES

The application is illustrated by way of example and not limitation in the figures wherein like reference characters generally indicate similar elements.

DESCRIPTION

The claimed subject matter is now described with reference to the figures, wherein like reference numerals are generally used to refer to like elements. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

The present disclosure is directed to a hybrid transformer, at times referred to merely as a transformer, a distribution transformer or as a versatile distribution transformer, which may be used in the distribution of power. A power distribution system may comprise one or more of the disclosed distribution transformers to facilitate lower distribution losses in the system (e.g., by regulating a voltage output by the one or more distribution transformers and/or by controlling a power factor input to the distribution transformer(s))

and/or to otherwise improve (e.g., optimize) operations of the power distribution system (e.g., also referred to as a distribution grid).

The transformer generally comprises an electromagnetic transformer and may comprise a power electronic AC-AC converter. The electromagnetic transformer comprises at least two ferromagnetic cores and at least three windings. Wound around the first ferromagnetic core is a first winding and a second winding. Wound around the second ferromagnetic core is a control winding and the second winding. An auxiliary winding may also be wound around the first ferromagnetic core and/or the second ferromagnetic core.

The electromagnetic transformer (e.g., and thus the distribution transformer comprising the electromagnetic transformer) may be separated into a primary side and a secondary side. The primary side may be configured to receive an input voltage and/or input current from a source and the secondary side may be configured to provide an output voltage and/or an output current to a load. Typically the second winding and the control winding are on one side of the electromagnetic transformer while the first winding is on the other side of the electromagnetic transformer. For example, in one embodiment, the first winding may be on the primary side while the second winding and control winding may be on the secondary side of the electromagnetic transformer. In another embodiment, the second winding and the control winding may be on the primary side of the electromagnetic transformer and the first winding may be on the secondary side of the electromagnetic transformer.

The electromagnetic transformer may be a liquid-filled transformer, wherein at least some of the cores and/or at least some of the windings are immersed in a dielectric fluid, or may be a dry-type transformer, wherein at least some of the cores and/or at least some of the windings are not immersed in a dielectric fluid. Instead, such components may be encased in dielectric resin, surrounded by an inert gas, and/or surrounded by ambient air, for example.

The distribution transformer may be a single-phase transformer or a multiphase (>1 phase) transformer, such as a three phase transformer, for example. Further, the distribution transformer may be constructed of a plurality of electromagnetic transformers that are linked together. By way of example, a three-phase distribution transformer may be comprised of a plurality of (e.g., 3) single-phase electromagnetic transformers electrically linked together. Moreover, the distribution transformer may be pole-mounted, pad-mounted, or mounted using other techniques. The distribution transformer may also be configured to receive an input voltage and/or input current from merely one source and/or may be configured to receive input voltages and/or input currents from a plurality of sources.

The AC-AC converter, where present, may be connected into the primary side of the electromagnetic transformer or may be connected to the secondary side of the electromagnetic transformer. Typically, the AC-AC converter is connected to the side of the electromagnetic transformer comprising the second winding and the control winding. Thus, where the primary side comprises the second winding and the control winding, the AC-AC converter may be connected into the primary side of the electromagnetic transformer. Where the secondary side of the electromagnetic transformer comprises the second winding and the control winding, the AC-AC converter may be connected into the secondary side of the electromagnetic transformer, for example.

Figure 1:
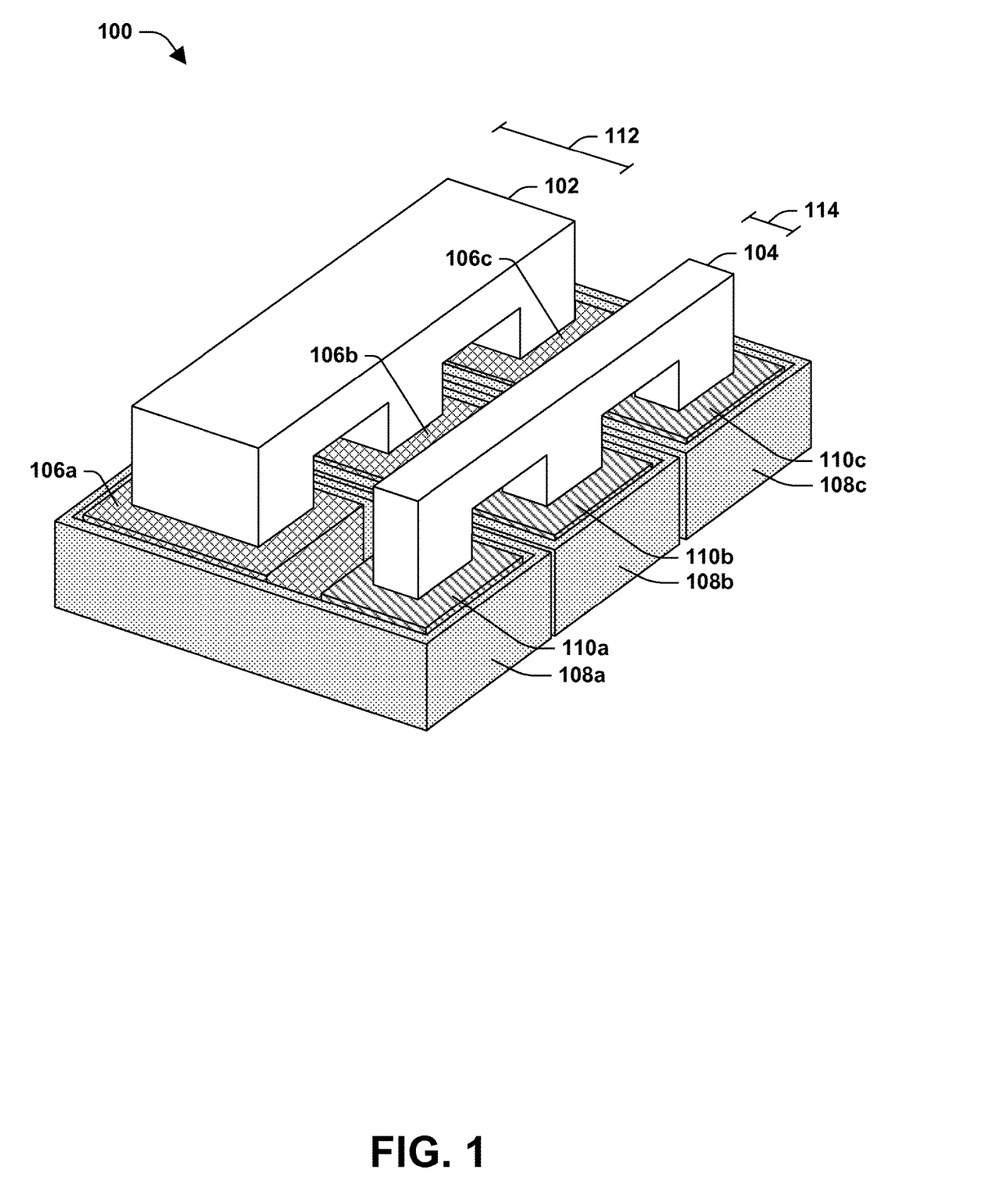
FIG. 1 illustrates an example electromagnetic transformer portion of a distribution transformer.

FIG. 1 illustrates a three-dimensional representation of an example distribution transformer 100 (e.g., or an electromagnetic portion of the distribution transformer). It may be appreciated that the example distribution transformer 100 may be referred to as a three-phase transformer because respective ferromagnetic cores 102, 104 comprise three legs. However, as described above, the distribution transformer may be a single-phase transformer, a two-phase transformer, and/or other multiphase transformer.

The distribution transformer 100 comprises at least two ferromagnetic cores 102 and 104, a set of one or more first windings 106a-c (e.g., represented by the cross-hatched pattern), a set of second windings 108a-c (e.g., represented by the dotted pattern), and a set of control windings 110a-c (e.g., represented by the diagonally-lined pattern). Typically, the number of first windings 106a-c, the number of second windings 108a-c, and the number of control windings 110a-c, is equal to the number of legs in the ferromagnetic cores 102, 104. For example, where the ferromagnetic cores 102, 104 respectively comprise three legs, the distribution transformer 100 may comprise three first windings 106a-c, three second windings 108a-c, and three control windings 110a-c. However, in some embodiments, the number of first, second, and/or control windings may be greater than the number of legs. For example, a three-legged transformer may comprise three first windings and six second windings (e.g., two second windings per leg), where merely some of the second windings are inductively coupled to a control winding (e.g., and are thus coupled to an AC-AC converter) and/or where all of the second windings are inductively coupled to a control winding (e.g., and thus all second windings are inductively coupled to an AC-AC converter). In one embodiment, the extra second windings may be utilized to provide auxiliary power to one or more control circuits, for example. The number of legs that comprise the first ferromagnetic core 102 is typically equal to the number of legs that comprise the second ferromagnetic core 104.

As illustrated, the first windings 106a-c are respectively wound around a leg of the first ferromagnetic core 102, the second windings 108a-c are respectively wound around a leg of the first ferromagnetic core 102 and a leg of the second ferromagnetic core 104, and the control windings 110a-c are respectively wound around a leg of the second ferromagnetic core 104. Thus, respective second windings 108a-c are inductively coupled to both a first winding 106a-c and a control winding 110a-c (e.g., second winding 108a is inductively coupled to first winding 106a and control winding 110a, second winding 108b is inductively coupled to first winding 106b and control winding 110b, etc.).

Depending on the configuration of the distribution transformer 100, the first windings 106a-c may be coupled to the source or may be coupled to the load. Where the first windings 106a-c are coupled to the source, the second windings 108a-c are typically coupled to the load (e.g., meaning the second windings 108a-c are part of the secondary side of the electromagnetic transformer). In such an embodiment, electrical signals induced in the respective second windings 108a-c may be a function of the inductive coupling between the first winding 106a-c and respective second windings 108a-c and may be a function of the inductive coupling between the control windings 110a-c and respective second windings 108a-c.

Conversely, where first windings 106a-c are coupled to the load, the second windings 108a-c are typically coupled to the source (e.g., meaning the second windings 108a-c are part of the primary side of the transformer). Thus, in such an embodiment, the electrical signals induced in respective first winding 106a-c may be a function of the inductive coupling between the first winding 106a-c and respective second windings 108a-c and may be a function of the inductive coupling between the control windings 110a-c and respective second windings 108a-c.

With reference to a single leg of the distribution transformer 100, the flux (φ) of the second winding 108a is substantially equal to the flux of the first winding 106a plus or minus the flux of the control winding 110a. Therefore, the voltage of the second winding 108a divided by the number of turns in the second winding 108a may be substantially equal to the voltage of the first winding 106a divided by the number of turns in the first winding 106a plus or minus the voltage of the control winding 110a divided by the number of turns in the control winding 110a. It may be appreciated that a determination regarding whether the symbol is a plus symbol or a minus symbol may depend upon the direction of the winding and/or the direction of current flow therein.

The number of turns in respective first windings 106a-c, respective second windings 108a-c, and respective third windings 110a-c are a function of the desired step-up or step-down in voltage and/or the desired level of voltage regulation. However, in a multi-phase transformer, the number of turns in like windings is typically matched. Therefore, the first windings 106a-c are typically matched, the second windings 108a-c are typically matched, and the number of control windings 110a-c are typically matched.

The proportionality of a width 112 of the first ferromagnetic core 102 to a width 114 of the second ferromagnetic core 104 may be a function of the desired regulation capability. For example, where the width 114 of the second ferromagnetic core 104 is twenty-percent of the width 112 of the first ferromagnetic core, the voltage output may be regulated by about 40% using the second ferromagnetic core 104 (e.g., between 80% and 120% of the voltage that would have been output without utilizing the second ferromagnetic core 104). If the width 114 of the second ferromagnetic core 104 is equal to the width 112 of the first ferromagnetic core, the output voltage may be regulated from 0-200%. However, in practice, it may not be necessary to have such regulation capabilities. Therefore, the width 114 of the second ferromagnetic core 104 is typically less than the width 112 of the first ferromagnetic core 102 (e.g., to reduce the cost of manufacturing the transformer). Moreover, it may be appreciated that the ratio between the turns in the control windings 110a-c relative to the number of turns in a winding that serves as the input to the AC-AC converter may be inversely proportional to the ratio between the width 114 of the second ferromagnetic core 104 and the width 112 of the first ferromagnetic core 102. As an example, when the width 114 of the second ferromagnetic core 104 is 20% (e.g., $\frac{1}{5}^{th}$) of the width 112 of the first ferromagnetic core 102, the number of turns in control winding 110a may be five times the number of turns in second winding 108a if the second winding 108a serves as the input to the AC-AC converter (e.g., as illustrated in FIGS. 2 and 3).

Figure 2:
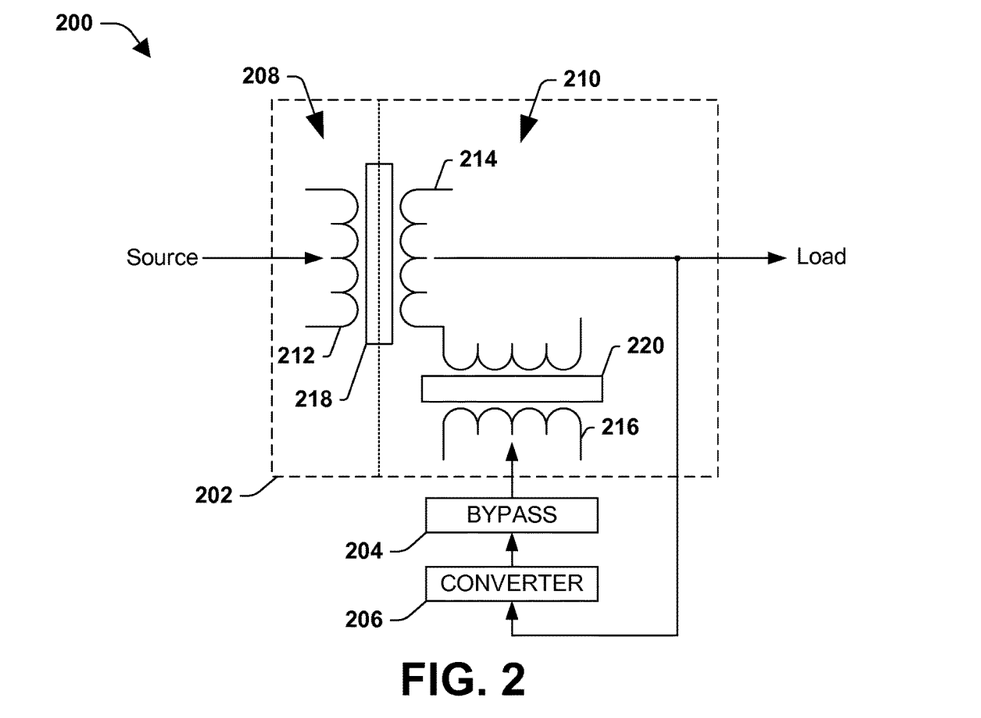
FIG. 2 illustrates a schematic of an example distribution transformer.
Figure 3:
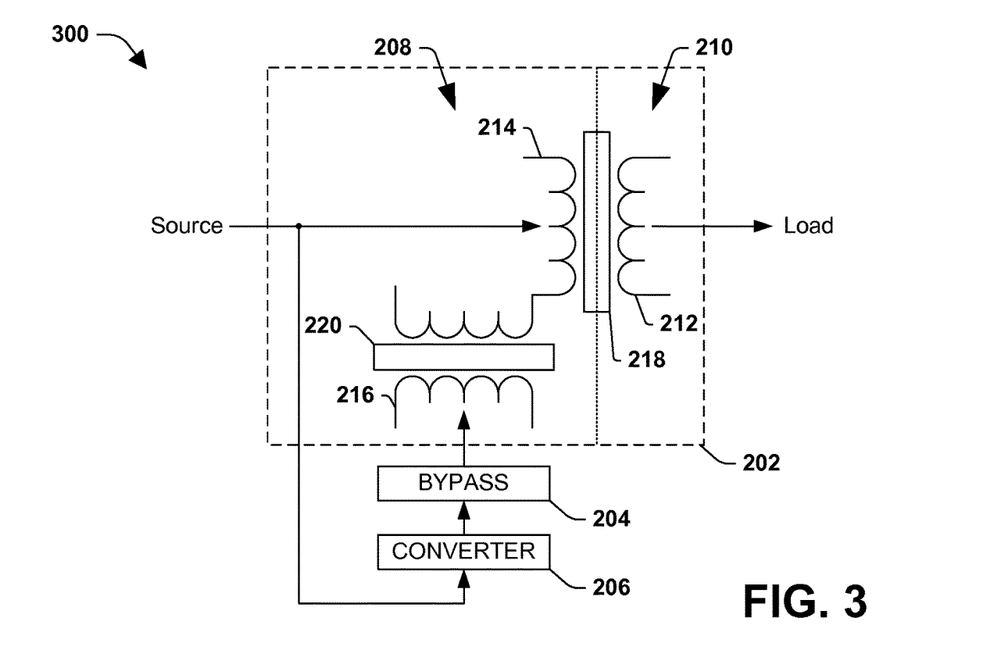
FIG. 3 illustrates a schematic of an example distribution transformer.

FIG. 2 illustrates a schematic diagram of an example arrangement 200 of a distribution transformer comprising an electromagnetic transformer 202 (e.g., 100 in FIG. 1), a by-pass mechanism 204, and a power electronic AC-AC converter 206. It may be appreciated that the example arrangement illustrates an arrangement for a single-phase of the distribution transformer. Thus, where the distribution transformer comprises multi-phases, the example arrangement may be substantially duplicated for respective phases, for example.

As illustrated, the electromagnetic transformer 202 comprises a primary side 208 and a secondary side 210. In the illustrated embodiment, the primary side 208 comprises a first winding 212 (e.g., 106a in FIG. 1) and is configured to receive an input voltage and/or input current from a power source. The secondary side 210 comprises a second winding 214 (e.g., 108a in FIG. 1) and a control winding 216 (e.g., 110a in FIG. 1) and is configured to produce an output voltage and/or output current to be supplied to a load. The first winding 212 and the second winding 214 are wound around a first ferromagnetic core 218 (e.g., 102 in FIG. 1) causing the first winding 212 to be inductively coupled to the second winding 214. The second winding 214 is also wound around a second ferromagnetic core 220 (e.g., 104 in FIG. 1), as is the control winding 216, causing the control winding 216 to be inductively coupled to the second winding 214. Thus, the second winding 214 is inductively coupled to both the first winding 212 and the second winding 216.

Figure 7:
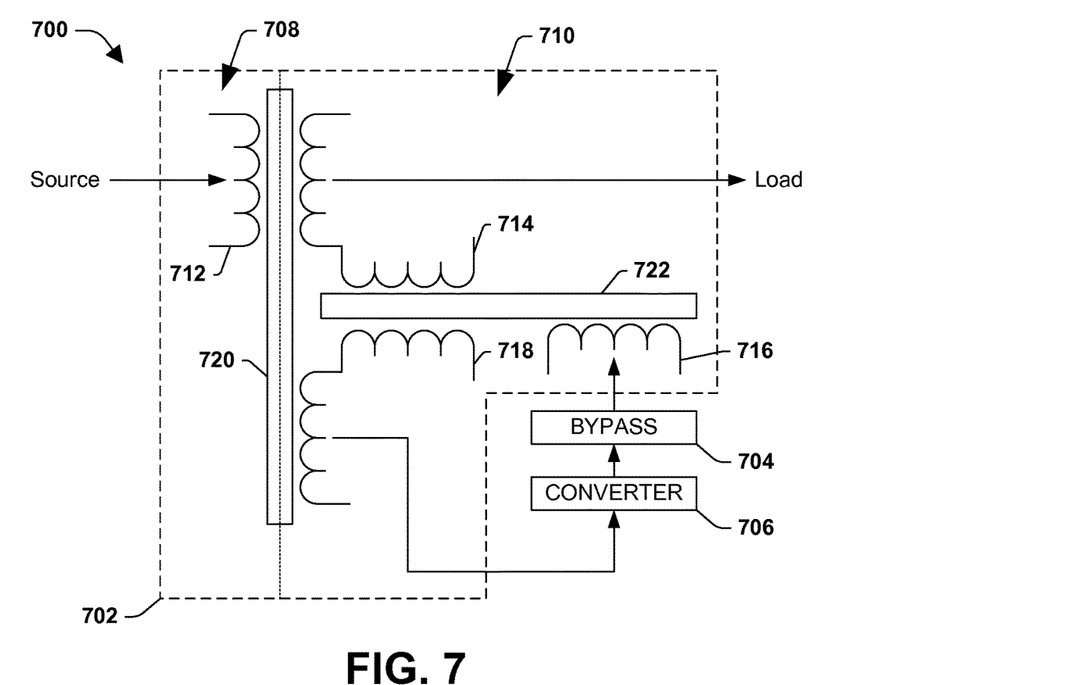
FIG. 7 illustrates a schematic of an example distribution transformer.
Figure 8:
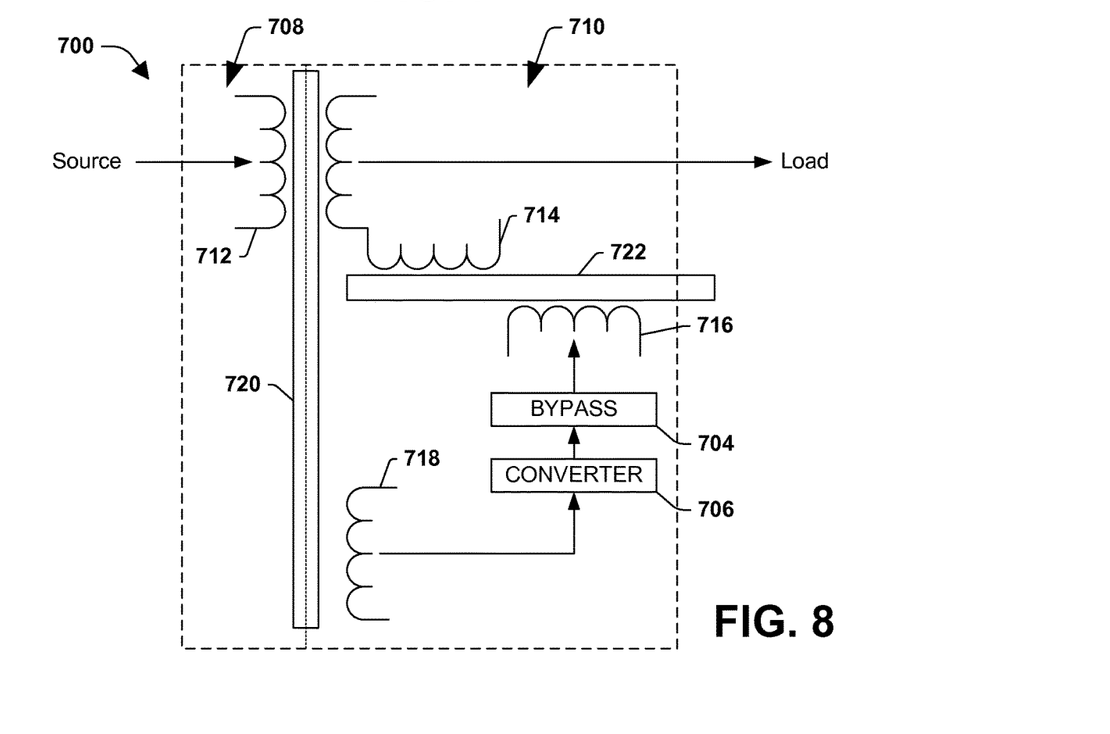
FIG. 8 illustrates a schematic of an example distribution transformer.

The AC-AC converter 206 is typically connected into the side of the electromagnetic transformer 202 comprising the control winding 216. For example, in the illustrated arrangement 200, the AC-AC converted is connected into the secondary side 210 of the electromagnetic transformer 200. As may be described in more detail below, the AC-AC converter is configured to regulate the voltage from the electromagnetic transformer 202 (e.g., compensating for deviations in the voltage input into the electromagnetic transformer 202 by the source) and/or to control a power factor on the primary side 208 of the electromagnetic transformer 202. In this embodiment, where the AC-AC converter 206 is directly connected to the load, the AC-AC converter 206 is typically rated to support the full load. However, in other embodiments, such as at least some of the embodiments described below (e.g., as illustrated in FIGS. 7 and 8), the AC-AC converter 206 may be rated to support less than the full load.

The bypass mechanism 204, which is typically connected in series or parallel with the AC-AC converter 206, is also connected to the secondary side 210 of the electromagnetic transformer 202 in the illustrated arrangement 200. Such a bypass mechanism 204 may be optional and is configured to facilitate an electrical bypass of the AC-AC converter 206 when there is a failure in the AC-AC converter 206 and/or when the transformer is overloaded by a specified amount (e.g., due to a short circuit in the load) (e.g., to mitigate damage to the AC-AC converter 208 and/or to mitigate an overcurrent in the AC-AC converter 208), for example. That is, stated differently, the bypass mechanism 204 (e.g., a switching device) may be configured to electrically isolate the AC-AC converter 206 from the remaining aspects of the distribution transformer and/or short the control winding under particular conditions. The activation of the bypass mechanism to short the control winding typically has the effect of reducing the flux in the second ferromagnetic core to a value close to zero.

FIG. 3 illustrates another embodiment of an example arrangement 300 of a distribution transformer, where the second winding 214 and the control winding 216 are positioned on a primary side 208 of the electromagnetic transformer 200 (e.g., and are thus configured to receive an input voltage and/or input current from a source) and the first winding 212 is positioned on a secondary side 210 of the electromagnetic transformer 200 (e.g., and is thus configured to provide for an output voltage and/or output current to a load).

In an embodiment where the control winding 216 is positioned on a primary side 208 of the electromagnetic transformer, the AC-AC converter 206 and/or bypass mechanism 204 are typically also connected into the primary side 208 of the electromagnetic transformer 200. Further, given that the AC-AC converter 206 is directly connected to the source, the AC-AC converter 206 is typically rated to support the full voltage applied by the source to the distribution transformer.

Figure 4:
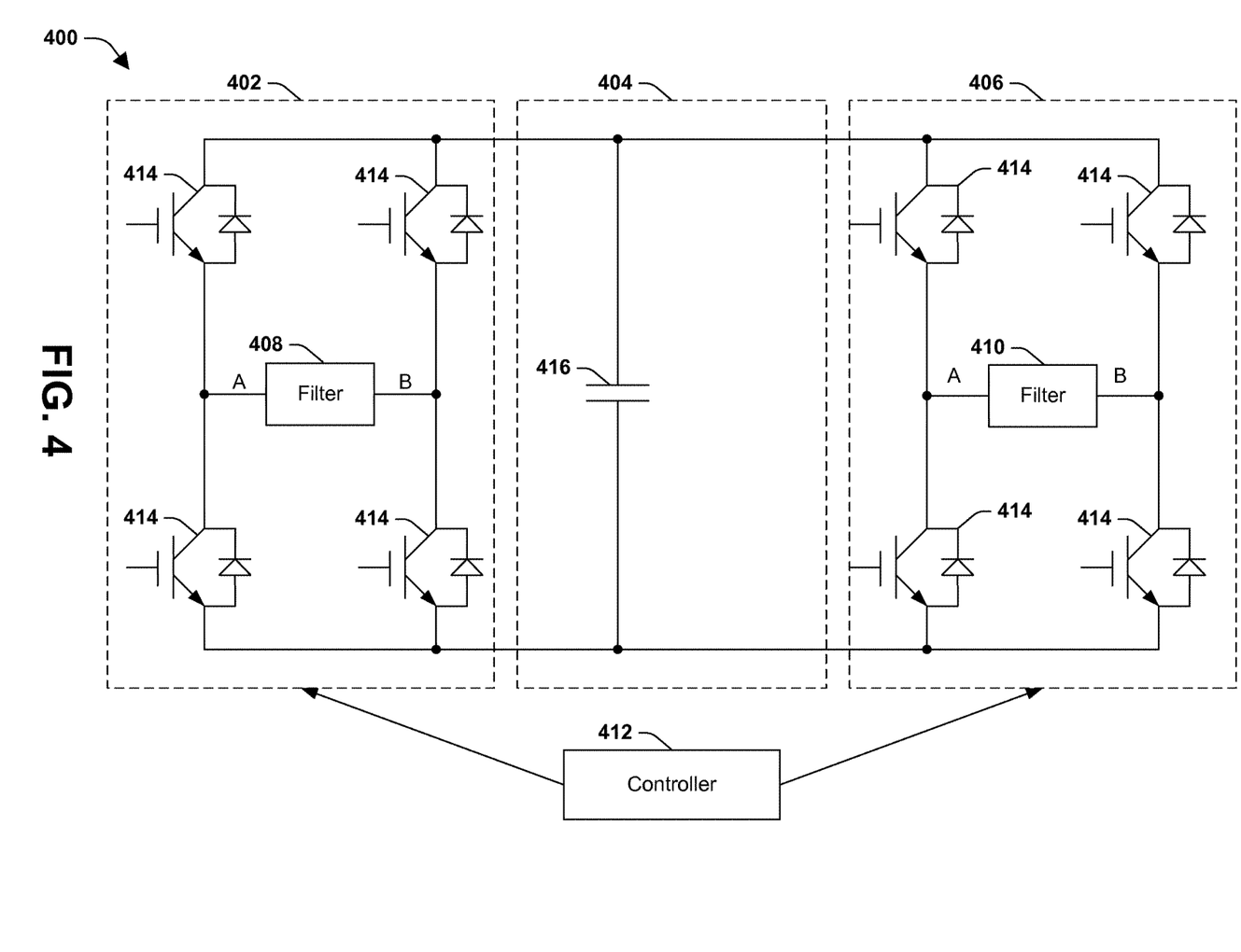
FIG. 4 illustrates a schematic of an example AC-AC converter of a distribution transformer.

FIG. 4 illustrates a schematic of an example AC-AC converter 400 (e.g., 206 in FIGS. 2 and 3), where the AC-AC converter 400 is an AC-DC-AC type converter. In this arrangement, the AC-AC converter 400 comprises a first switching bridge 402 connected by a DC link or bridge 404 (e.g., comprised of a capacitor 416) to a second switching bridge 406. In an arrangement of the distribution transformer illustrated in FIG. 2, the first switching bridge 402 may be connected to the ends of the second winding (e.g., 214 in FIG. 2) and the second switching bridge 406 may be connected to the bypass mechanism 204 and/or to the ends of the control winding 216 (e.g., where the bypass mechanism 204 is not present in the distribution transformer), for example. In an arrangement of the distribution transformer illustrated in FIG. 3, the first switching bridge 402 may be connected to the source and the second switching bridge 406 may be connected to the bypass mechanism 204 and/or to the ends of the control winding 216, for example. It may be appreciated that for ease of understanding, it is assumed that the input to the AC-AC converter 400 is received at the first switching bridge 402 and the output of the AC-AC converter 400 is output at the second switching bridge 406. Where the input and outputs are reversed, the arrangements may differ from the foregoing arrangements.

A filter 408 may be connected between the first switching bridge 402 and an input to the first switching bridge 402 (e.g., such as the second winding 214 in FIG. 2). Another filter 410 may be connected to an output of the second switching bridge 406 (e.g., such as the bypass mechanism 204 and/or the ends of the control winding 216 in FIG. 2).

Respective first and second switching bridges 402, 406 may be connected to and/or controlled by a controller 412. Further, respective first and second switching bridges 402, 406 may comprise a plurality of switching devices 414. For example, as shown in FIG. 4, respective first and second switching bridges 402, 406 may comprise a pair of arms connected in parallel, with respective arms having a pair of switching devices 414 connected in series. In one example, respective switching devices 414 may comprise an insulated gate bipolar transistor (IGBT) and an anti-parallel diode. However, in another embodiment, the switching devices 414 may be comprised of different and/or additional components. Moreover, it may be appreciated that some of the switching devices 414 may comprise different components than other switching devices 414, and thus the switching devices 414 may be non-uniform in configuration and/or components.

Figure 5:
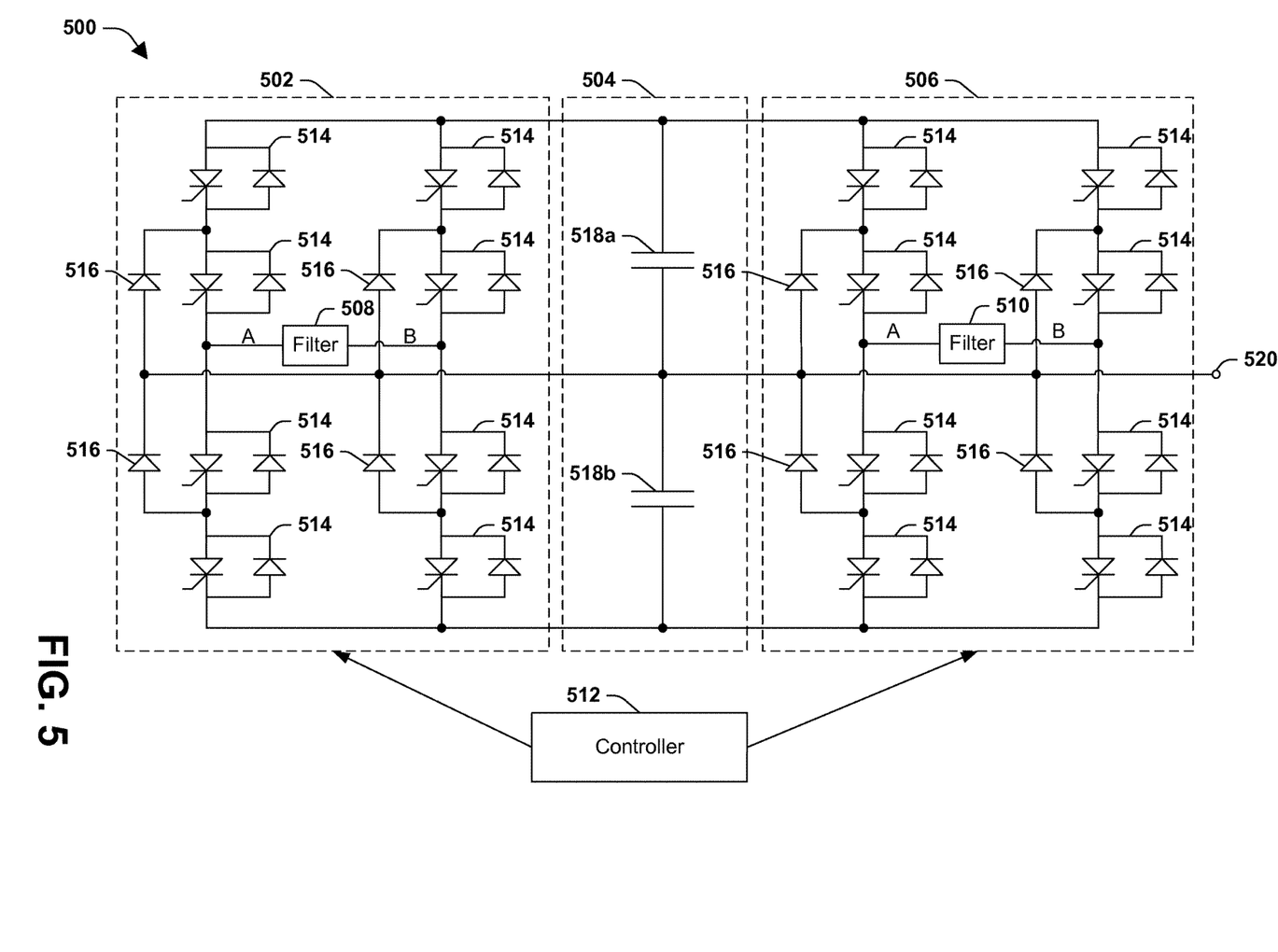
FIG. 5 illustrates a schematic of an example AC-AC converter of a distribution transformer.

FIG. 5 illustrates a schematic of an example AC-AC converter 500 (e.g., 206 in FIGS. 2 and 3), where the AC-AC converter 500 is an AC-DC-AC type converter. In this arrangement, the AC-AC converter 500 is a neutral point converter (NPC) having three levels and the AC-AC converter 500 comprises a first switching bridge 502 connected by a DC link or bridge 504 to a second switching bridge 506. In an arrangement of the distribution transformer illustrated in FIG. 2, the first switching bridge 502 may be connected to the ends of the second winding (e.g., 214 in FIG. 2) and the second switching bridge 506 may be connected to the bypass mechanism 204 and/or to the ends of the control winding 216, for example. In an arrangement of the distribution transformer illustrated in FIG. 3, the first switching bridge 502 may be connected to the source and the second switching bridge 506 may be connected to the bypass mechanism 204 and/or to the ends of the control winding 216, for example. Again, it is assumed that the input to the AC-AC converter 500 is received at the first switching bridge 502 and the output of the AC-AC converter 500 is output at the second switching bridge 506. Where the input and outputs are reversed, the arrangements may differ from the foregoing arrangements.

A filter 508 may be connected between the first switching bridge 502 and an input to the first switching bridge 502 (e.g., such as the second winding 214 in FIG. 2). Another filter 510 may be connected to an output of the second switching bridge 506 (e.g., such as the bypass mechanism 204 and/or the ends of the control winding 216 in FIG. 2).

Respective first and second switching bridges 502, 506 may be connected to and/or controlled by a controller 512. Further, respective first and second switching bridges 502, 506 may comprise a plurality of switching devices 514. For example, as shown in FIG. 5, respective first and second switching bridges 502, 506 may comprise a pair of arms connected in parallel, with respective arms having four switching devices 514 connected in series. Respective arms may also comprise one or more clamping diodes 516 connected between a top pair of the switching devices 514 and a bottom pair of the switching devices 514, for example.

In one example, respective switching devices 514 may comprise an insulated gate bipolar transistor (IGBT) and an anti-parallel diode. However, in another embodiment, the switching devices 514 may be comprised of different and/or additional components. Moreover, it may be appreciated that some of the switching devices 514 may comprise different components than other switching device 514, and thus the switching devices 514 may be non-uniform in configuration and/or components.

The DC link or bridge 504 may comprise two capacitors 518 connected in series, for example, and the clamping diodes 516 may be connected (e.g., clamped) to the DC link or bridge 504 between a first capacitor 518a and a second capacitor 518b (e.g., at the middle or neutral point where the voltage is half of the voltage across the entire DC bridge 504). A tap 520 may be connected between the first and second capacitors 518a, 518b (e.g., at the neutral point) as well, for example.

Figure 6:
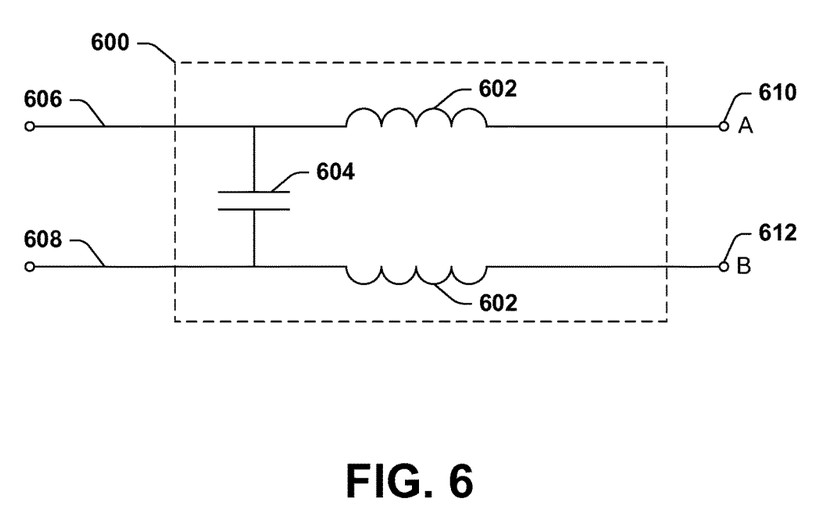
FIG. 6 illustrates a schematic of an example filter of a distribution transformer.

FIG. 6 illustrates a schematic of an example filter 600 as provided for in FIGS. 4 and 5 (e.g., 408 and/or 410 in FIG. 4; 508 and/or 510 in FIG. 5). The example filter 600 comprises two inductors 602 connected into (incoming) lines 606 and 608, respectively. A capacitor 604 may be connected between the lines 606 and 608. Such a filter 600 may help mitigate high frequency harmonics from being introduced into the output voltage of a distribution transformer (e.g., 200 in FIG. 2 and 300 in FIG. 3) and/or into the currents in the windings as a result of the switching of switching devices (e.g., 414 in FIG. 4 and 514 in FIG. 5) of the AC-AC converters. The filter may be connected to the AC-AC converter at the nodes labeled A and B 610, 612 (e.g., where A and B are also labeled in FIGS. 4 and 5). It may be appreciated that although the example filter 600 describes an LC filter, it should be appreciated that other types of filters may be used. For example, an L or an LCL filter may be used.

It may be appreciated that the foregoing topologies of the AC-AC converter and/or the filter are merely example topologies and other topologies of AC-AC converters and/or filters are also contemplated. Moreover other topologies, features, and/or benefits of the AC-AC converter and/or the filter may be described in U.S. patent application Ser. No.

12/701,235 and/or U.S. patent application Ser. No. 12/713,766, respectively assigned to ABB Research LTD and incorporated herein by reference.

FIGS. 7 and 8 illustrate other example arrangements of a distribution transformer comprising at least a first winding, a second winding, and a control winding. More specifically, FIGS. 7 and 8 introduce a distribution transformer 700 (e.g., 200 in FIG. 2) comprising yet another winding, referred to herein as an auxiliary winding 718. The auxiliary winding 718 is typically positioned on the same side of an electromagnetic transformer 702 as the control winding 716 (e.g., 216 in FIG. 2). Thus, in the illustrated embodiment, the auxiliary winding 718 may be positioned on a secondary side 710 of the electromagnetic transformer 702 (e.g., 202 in FIG. 2) (e.g., although in another embodiment the auxiliary winding 718 and control winding 716 may be positioned on the primary side 708 of the transformer 702). The auxiliary winding 718 is typically electrically coupled to the AC-AC converter 706 (e.g., 206 in FIG. 2) and is configured to supply an input voltage and/or input current to the AC-AC converter 706. That is, stated differently, the AC-AC converter 706 is configured to receive an AC signal from the auxiliary winding 718 and to output an AC signal to the control winding 716. In this way, the AC-AC converter 706 may be electrically isolated from the electromagnetic transformer 702 via the auxiliary winding 718, thus allowing the AC-AC converter 706 to be rated to support less than the full load and/or less than the voltage applied by the source, for example. By way of example, source and/or load voltages may be medium to high voltages, while the AC-AC converter 706 may be a low voltage converter.

More particularly with respect to FIG. 7, a schematic diagram of an example arrangement of a distribution transformer 700 is illustrated. The distribution transformer comprises an electromagnetic transformer 702, a by-pass mechanism 704 (e.g., 204 in FIG. 2), and a power electronic AC-AC converter 706. It may be appreciated that the example arrangement illustrates an arrangement for a single-phase of the distribution transformer. Thus, where the distribution transformer comprises multi-phases, the example arrangement may be substantially duplicated for respective phases, for example. It may also be appreciated, for purposes of brevity, components of FIG. 7 that are substantially similar to components of FIG. 2 may not be discussed in more detail below.

As illustrated, the electromagnetic transformer 702 comprises a primary side 708 and a secondary side 710. In the illustrated embodiment, the primary side 708 comprises a first winding 712 (e.g., 212 in FIG. 2) and is configured to receive an input voltage and/or input current from a power source. The secondary side 710 comprises a second winding 714 (e.g., 214 in FIG. 2), the control winding 716, and the auxiliary winding 718 and is configured to produce an output voltage and/or output current to be supplied to a load. The first winding 712, the second winding 714, and the auxiliary winding 718 are wound around a first ferromagnetic core 720 (e.g., 218 in FIG. 1) causing the first winding 712 to be inductively coupled to the second winding 714 and inductively coupled to the auxiliary winding 718. The second winding 714 and the auxiliary winding 718 are also wound around a second ferromagnetic core 722 (e.g., 220 in FIG. 1), as is the control winding 716, causing the second winding 714 to be inductively coupled to the control winding 716 and to the auxiliary winding 718. Thus, the second winding 714 and the auxiliary winding 718 are inductively coupled to the control winding 716. Moreover, referring to FIG. 1, the auxiliary winding 718 may follow a path similar to the second winding 108a in FIG. 1 (e.g., thus wrapping around the first winding 106a and the control winding 110a).

FIG. 8 illustrates a schematic diagram of yet another example arrangement of the distribution transformer 700. The primary side 708 comprises the first winding 712 and the secondary side 710 comprises the second winding 714, the control winding 716, and the auxiliary winding 718. The first winding 712, the second winding 714, and the auxiliary winding 718 are wound around a first ferromagnetic core 720 (e.g., 104 in FIG. 1) causing the first winding 712 to be inductively coupled to the second winding 714 and inductively coupled to the auxiliary winding 718. The second winding 714 is also wound around a second ferromagnetic core 722 (e.g., 722 in FIG. 7), as is the control winding 716, causing the second winding 814 to be inductively coupled to the control winding 716. In contrast to the arrangement illustrated in FIG. 7 where the auxiliary winding 18 is wound around both ferromagnetic cores 720 and 722, the auxiliary winding 718 is merely wound around the first ferromagnetic core 720 in the example arrangement illustrated in FIG. 8. In such an embodiment, the auxiliary winding 718 may follow a path similar to the first winding 106a in FIG. 1 (e.g., wrapping around the first winding 106a and/or the merely the first ferromagnetic core 102), for example.

It may be appreciated that the example distribution transformers described above may have numerous advantages over conventional distribution transformers. For example, the integration of control windings into the distribution transformer may provide for manufacturing a single physical structure configured to convert voltages and/or to regulate voltages. Moreover, at least some of the foregoing embodiments of distribution transformers may improve voltage and/or harmonic compensation over conventional transformers. Further, at least some of the foregoing arrangements (e.g., such as those arrangements illustrated in FIGS. 7 and 8) may facilitate manufacturing multiple distribution transforms with varying voltage and/or power levels without having to redesign the AC-AC converter for respective voltage levels.

Figure 9:
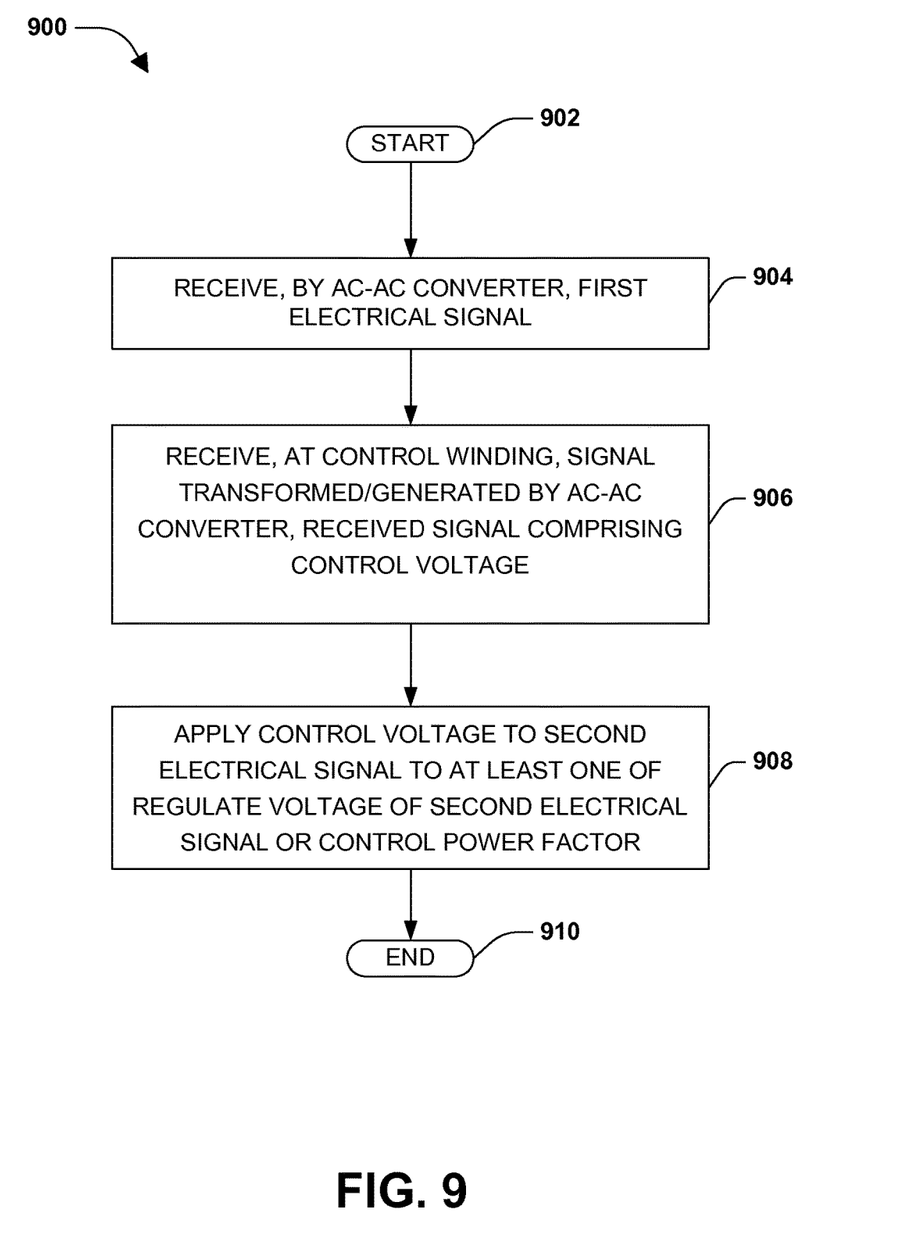
FIG. 9 is a flow diagram illustrating an example method as set forth herein.

FIG. 9 illustrates an example method 900 for regulating a voltage output by a distribution transformer and/or for controlling a power factor on a primary side of the distribution transformer to which the input is received.

The example method 900 begins at 902 and a first electrical signal is received by an AC-AC converter (e.g., 206 in FIG. 2) at 904. The first electrical signal received by the AC-AC converter may be received from a source (e.g., as illustrated in FIG. 3), a second winding electrically coupled to a load (e.g., as illustrated in FIG. 2), and/or an auxiliary winding inductively coupled to at least a first winding that is electrically coupled to a source and is configured to receive the input voltage (e.g., as illustrated in FIGS. 7 and 8), for example.

The AC-AC converter, which may be an AC-DC-AC type converter as illustrated in FIGS. 4-5, for example, is configured to generate a control voltage based upon the first electrical signal input into the AC-AC converter. That is, the AC-AC converter is configured to transform the first electrical signal (e.g., an input signal) into an output signal comprising a control voltage that, when combined with a second electrical signal from the second winding connected to the load, and/or when combined with a second electrical signal from the source reduces and/or increases the voltage of the second electrical signal (e.g., reduces/increases the output load voltage). More particularly, the AC-AC converter is operable to facilitate controlling the relative phase of the input voltage and input current of the distribution transformer and/or to facilitate reducing fluctuation in the output voltage of the distribution transformer (e.g., in the event of an increase or decrease in the input voltage to the distribution transformer and/or to achieve lower power consumption from the overall loads in a distribution system). In this way, an electrical signal that is output to the load by the distribution transformer may have a voltage that is more controlled and/or regulated than a voltage that would be from a convention electromagnetic transformer, for example.

At 906 in the example method 900, the signal transformed/generated by the AC-AC converter is output from the AC-AC converter and is received at the control winding, and the control voltage of the electrical signal output by AC-AC converter is applied to the second electrical signal (e.g., such as the electrical signal from the source and/or the electrical signal supplied to the load) to at least one of regulate or change a voltage of the second electrical signal and/or control a power factor at 908. That is, stated differently, as the signal comprising the control voltage (e.g., output from the AC-AC converter and received by the control winding) passes through the control winding, an electromagnetic field may be generated by the control winding that induces a voltage in the second winding to which the control winding is inductively coupled. In this way, the electrical signal transformed/generated by the AC-AC converter is combined with a second electrical signal from the source (e.g., as illustrated in FIG. 3) and/or a second electrical signal induced in the second winding by the first winding (e.g., as illustrated in FIGS. 2, 7, and 8) to increase or decrease the voltage of the electrical signal from the source and/or the electrical signal induced in the second winding. In this way, the electrical signal transformed/generated by the AC-AC converter combines with another signal to regulate and/or control a voltage of the signal, for example.

The example method 900 ends at 910.

Although the subject matter has been described in language specific to structural features or methodological acts, it is to be understood that the subject matter of the appended claims is not necessarily limited to the specific features or acts described above. Rather, the specific features and acts described above are disclosed as example forms of implementing the claims.

Various operations of embodiments are provided herein. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims.

What is claimed is:

1. A distribution transformer having a primary side for receiving an input voltage and an input current from a source and a secondary side for providing an output voltage and an output current to a load, the distribution transformer comprising:
   at least a first ferromagnetic core and a second ferromagnetic core spaced apart from the first ferromagnetic core;
   a first winding wound around the first ferromagnetic core and electrically coupled to a source;
   an auxiliary winding wound around the first ferromagnetic core, wherein the auxiliary winding is inductively coupled to the first winding through the first ferromagnetic core;
   an AC-AC converter configured to receive a first electrical signal output by the auxiliary winding and generate a control voltage based upon the first electrical signal;
   a control winding electrically coupled to the AC-AC converter and wound around the second ferromagnetic core; and
   a second winding wound around the second ferromagnetic core and coupled to the load, wherein:
      the control winding and the auxiliary winding are electrically isolated from the source and the load by the first ferromagnetic core and the second ferromagnetic core.

2. The distribution transformer of claim 1, comprising a bypass mechanism configured to short the control winding and reduce flux in the second ferromagnetic core.

3. The distribution transformer of claim 1, wherein the first ferromagnetic core is spaced apart from the second ferromagnetic core by the first winding and the control winding at a location where the first ferromagnetic core is nearest to the second ferromagnetic core.

4. The distribution transformer of claim 1, wherein:
   the control voltage is applied to a second electrical signal induced in the second winding.

5. The distribution transformer of claim 1, wherein:
   the second winding is further wound around the first ferromagnetic core.

6. The distribution transformer of claim 1, wherein the auxiliary winding is wound around merely the first ferromagnetic core.

7. The distribution transformer of claim 1, wherein the auxiliary winding is further wound around the second ferromagnetic core.

8. The distribution transformer of claim 1, wherein the first winding is wound around merely the first ferromagnetic core.

9. The distribution transformer of claim 8, wherein the second winding is further wound around the first ferromagnetic core.

10. The distribution transformer of claim 9, wherein the auxiliary winding is further wound around the second ferromagnetic core.

11. The distribution transformer of claim 9, wherein the auxiliary winding is wound around merely the first ferromagnetic core.

12. The distribution transformer of claim 10, comprising a bypass mechanism disposed between the AC-AC converter and the control winding and configured to short the control winding.

13. The distribution transformer of claim 11, comprising a bypass mechanism disposed between the AC-AC converter and the control winding and configured to short the control winding.

14. The distribution transformer of claim 1, wherein a width of the second ferromagnetic core about which the control winding and the second winding are wound is less than a width of the first ferromagnetic core about which the first winding is wound.

15. The distribution transformer of claim 14, wherein a number of turns in the control winding is inversely proportional to a ratio between the width of the second ferromagnetic core and the width of the first ferromagnetic core.

16. The distribution transformer of claim 1, wherein the AC-AC converter regulates the output voltage of the distribution transformer.

17. The distribution transformer of claim 1, comprising a bypass mechanism disposed between the AC-AC converter and the control winding and configured to short the control winding.

18. A method for at least one of regulating an output voltage of a distribution transformer or controlling a power factor on a primary side of the distribution transformer to which an input voltage is received, comprising:
   receiving, at an AC-AC converter, a first electrical signal output by an auxiliary winding inductively coupled to a first winding through a first ferromagnetic core around which the auxiliary winding and the first winding are wound, wherein the first winding is electrically coupled to a source;
   generating, at the AC-AC converter, a control voltage based upon the first electrical signal; and
   applying the control voltage to a second electrical signal induced via a control winding electrically coupled to the AC-AC converter and wound around a second ferromagnetic core to which a second winding is wound, wherein:
      the second winding is coupled to a load,
      the control winding and the auxiliary winding are electrically isolated from the source and the load by the first ferromagnetic core and the second ferromagnetic core, and
      the AC-AC converter regulates the output voltage of the distribution transformer.

19. The method of claim 18, wherein the second electrical signal is induced at the second winding.

20. The method of claim 18, wherein the auxiliary winding is further wound around the second ferromagnetic core.

* * * * *